United States Patent [19]

Cannon

[11] Patent Number: 5,025,619
[45] Date of Patent: Jun. 25, 1991

[54] METHOD AND APPARATUS FOR INCUBATING AND HATCHING EGGS

[75] Inventor: Robert W. Cannon, 6565 Joseph St., SE., Salem, Oreg. 97301

[73] Assignee: Robert W. Cannon, Salem, Oreg.

[21] Appl. No.: 324,943

[22] Filed: Mar. 16, 1989

[51] Int. Cl.$^5$ ..................... A01K 41/02; A01K 41/04
[52] U.S. Cl. ....................................... 119/41; 119/35
[58] Field of Search ................. 119/41, 42, 35, 37, 119/39; 165/163

[56] References Cited

U.S. PATENT DOCUMENTS

| | | | |
|---|---|---|---|
| 324,274 | 0/1885 | Rosebrook | 119/43 |
| 702,780 | 6/1902 | Darling | 119/43 |
| 1,345,483 | 7/1920 | Ewry | 119/44 |
| 1,361,038 | 12/1920 | Flickinger | 119/44 |
| 1,489,597 | 4/1924 | Hillpot | 119/44 |
| 1,496,650 | 6/1924 | Reinsperg | 119/44 |
| 1,545,425 | 7/1925 | Hillpot | 119/44 |
| 1,573,038 | 2/1926 | Branington | 119/43 |
| 1,781,336 | 11/1930 | Marshall | 119/37 |
| 1,927,994 | 9/1933 | Rackstraw | 119/37 |
| 1,952,599 | 3/1934 | Mackay | 119/42 |
| 2,026,801 | 1/1936 | Ross | 119/33 |
| 2,074,190 | 3/1937 | Robbins | 119/43 |
| 2,137,769 | 11/1938 | Crawford | 257/1 |
| 2,193,370 | 3/1940 | Kocher | 261/107 |
| 2,296,930 | 9/1942 | Ihler | 119/37 |
| 2,437,719 | 4/1948 | Crawford | 119/41 |
| 2,646,930 | 7/1953 | Dryden | 236/2 |
| 2,793,581 | 5/1957 | Cannon | 99/242 |
| 2,887,090 | 5/1959 | Cannon | 119/1 |
| 2,997,021 | 8/1961 | Bailey | 119/37 |
| 3,470,851 | 10/1969 | Cannon | 119/43 |
| 3,489,124 | 1/1970 | Cannon | 119/43 |
| 3,797,172 | 3/1974 | Cannon | 49/463 |
| 3,820,507 | 6/1974 | Dugan et al. | 119/35 |
| 3,854,452 | 12/1974 | Bardet | 119/37 |
| 3,923,006 | 12/1975 | Dugan et al. | 119/37 |
| 4,274,364 | 6/1981 | Forseth | 119/35 |
| 4,316,552 | 2/1982 | Hurley, III | 119/35 |
| 4,490,311 | 12/1984 | Shepherd | 126/113 |

FOREIGN PATENT DOCUMENTS

| | | | |
|---|---|---|---|
| 873994 | 10/1981 | U.S.S.R. | 119/35 |
| 897188 | 1/1982 | U.S.S.R. | 119/35 |
| 1220590 | 3/1986 | U.S.S.R. | 119/35 |
| 2056247 | 3/1981 | United Kingdom | 119/35 |

*Primary Examiner*—John G. Weiss
*Attorney, Agent, or Firm*—Marger et al. Johnson

[57] ABSTRACT

An incubator for incubating and hatching eggs includes a removable air control unit for humidifying, heating or cooling, and circulating air in the incubator. The air control unit is positioned between a pair of racks containing egg trays with removable inserts to accommodate differently sized eggs. Sensors monitor various parameters such as temperature and relative humidity. A computer controls the air control unit to maintain operator-selected values of the sensed parameters.

21 Claims, 5 Drawing Sheets

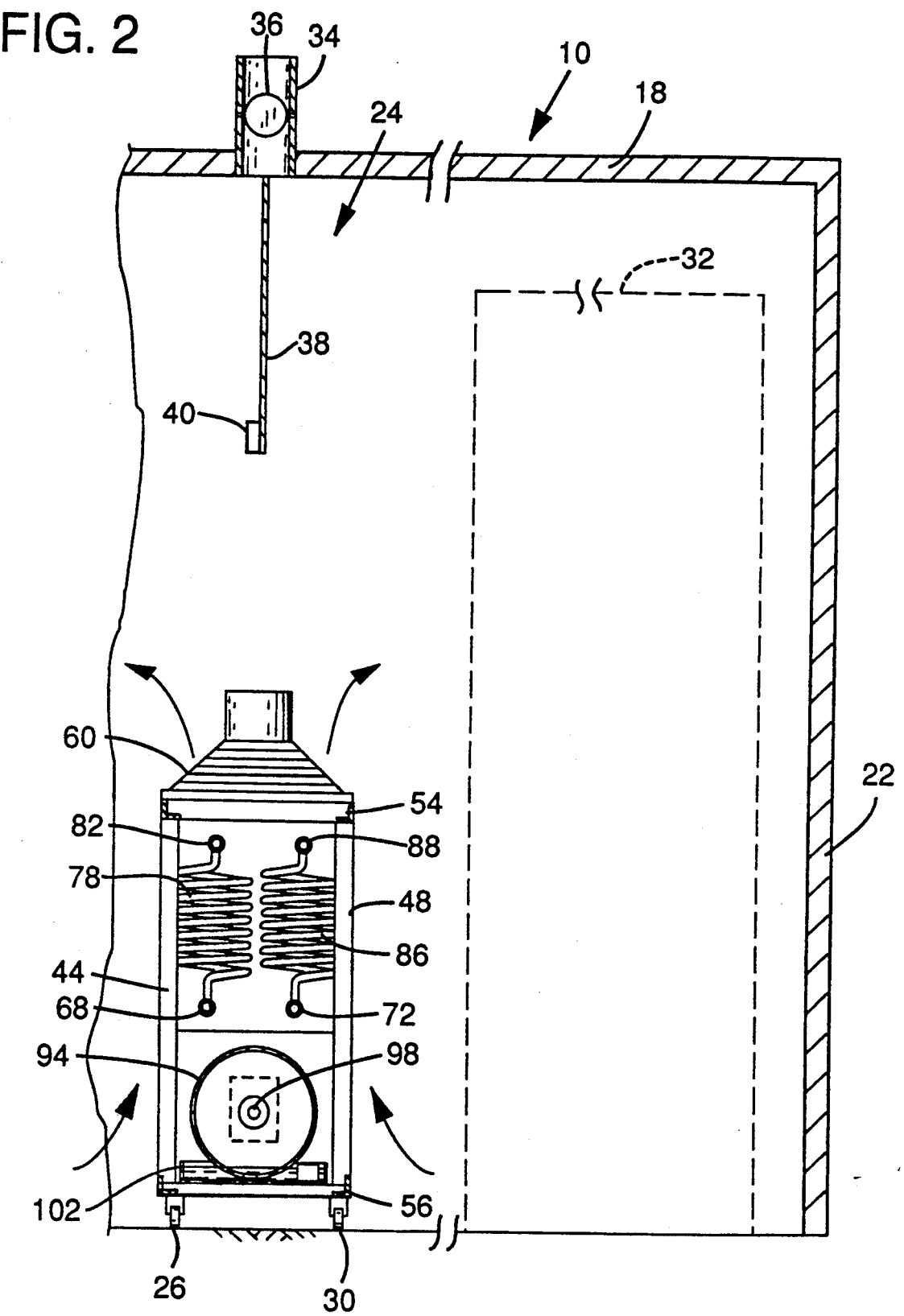

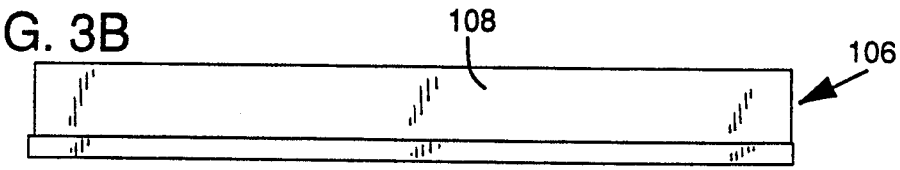
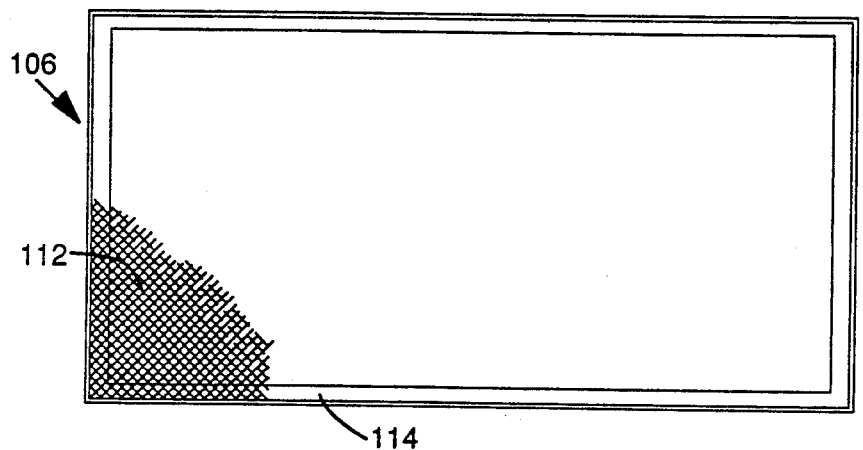
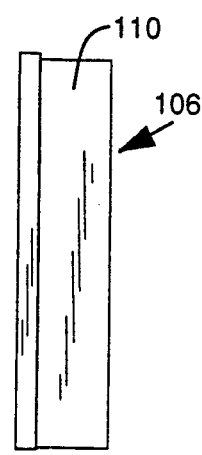
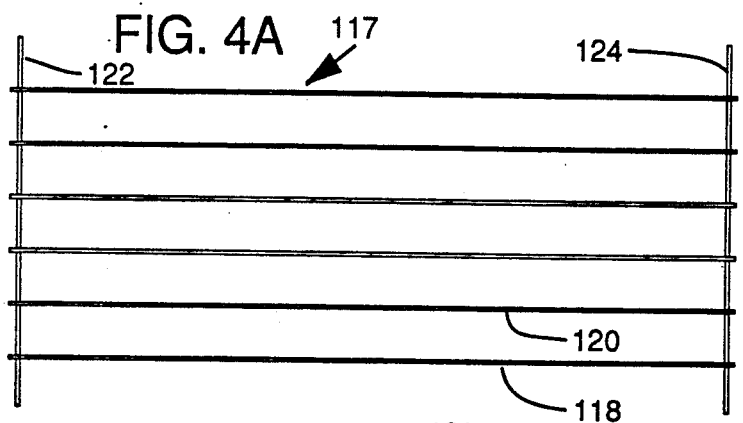
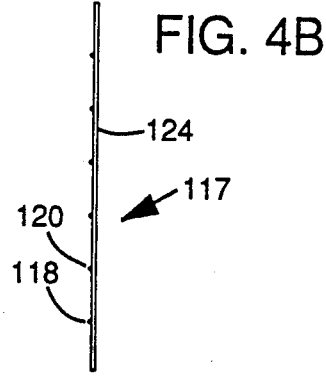
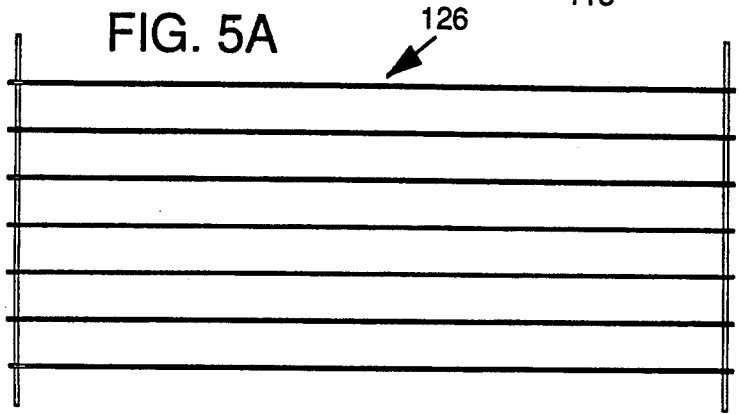
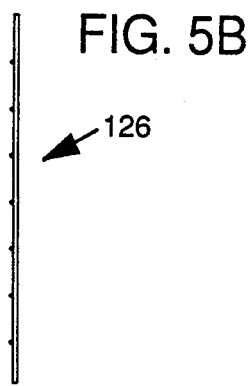

METHOD AND APPARATUS FOR INCUBATING AND HATCHING EGGS

BACKGROUND OF THE INVENTION

1. Field of the Invention

The present invention relates to methods and apparatus for incubating and hatching eggs and more particularly to such methods and apparatus in which eggs are placed in an environment in which factors such as temperature and relative humidity are monitored and controlled.

2. Description of the Related Art

Egg incubators in which humidity and temperature are controlled to optimize the number of hatched eggs are known in the art. For example, U.S. Pat. No. 2,026,801 to Ross discloses a humidity and temperature control for incubation. The Ross incubator uses a first coil for conducting steam and a second coil for conducting cold water to regulate temperature in the incubator. In Ross, steam is conducted in the steam coil to bring the incubator temperature to approximately 100°. When temperature arises above 100°, cold water is circulated to cool the incubator.

The Ross device suffers from several drawbacks. First, it is inefficient to simultaneously circulate steam and cold water. In addition, the coils for circulating hot and cold fluids in Ross are substantially horizontal thereby creating a possibility of air entrapment in the lines. Such coils are difficult to clean in place due to their construction and they are not easy to remove for remote cleaning and disinfecting.

U.S. Pat. No. 3,923,006 to Dugan et al. discloses a method and apparatus for incubating eggs. Although the Dugan et al. incubator incorporates heating, cooling and humidifying apparatus on a cart which may be rolled into and out of an incubator, it utilizes an electrical heating element and includes structure which is difficult to thoroughly clean and disinfect.

Cleaning and disinfecting incubators and all of the equipment therein is crucial to prevent growth of microorganisms which damage the incubating eggs and reduce the yield and quality of hatchlings.

A number of prior art devices for holding eggs in an incubator are known. Although some incorporate parallel dividers for separating rows of eggs, such as U.S. Pat. No. 1,573,038 to Branington and U.S. Pat. No. 324,274 to Rosebrook, the prior art devices do not provide a means for varying the space between the dividers to accommodate different egg sizes, e.g., chicken eggs versus turkey eggs.

U.S. Pat. No. 1,345,483 to Ewry discloses an egg tray having a removable divider; however, only one size divider is disclosed. Prior art egg trays tend to be designed for either incubating or hatching. An incubating tray is generally relatively short in height and is constructed to receive a number of eggs in close proximity to one another. A hatching tray, on the other hand, has higher sides and is designed for greater spacing between eggs to accommodate chicks after they are hatched. Usually, eggs are transferred from an incubating tray to a hatching tray prior to completion of egg incubation.

It is a general object of the present invention to provide a method and apparatus for incubating and hatching eggs which overcomes the above-enumerated prior art problems.

It is a more specific object of the present invention to provide such a method and apparatus which utilizes circulating fluids to heat or cool an incubator.

It is another specific object of the present invention to provide such a method and apparatus which diminishes the chance for air to be trapped in the fluid circulation system.

It is another specific object of the present invention to provide such a method and apparatus which is easy to clean and disinfect.

It is another object of the present invention to provide such a method and apparatus which easily accommodates eggs of different sizes.

It is another object of the present invention to provide such a method and apparatus which is transferless, i.e., one in which there is no need for transferring eggs between an incubating tray and a hatching tray.

SUMMARY OF THE INVENTION

In one aspect, the present invention provides a method for incubating and hatching eggs in which a plurality of eggs are placed in a chamber and a chamber temperature and minimum chamber relative humidity is selected. The temperature and relative humidity are periodically monitored. When the temperature is below the selected level, a hot fluid is circulated in a coil in the chamber and when the temperature is above the selected chamber temperature a cold fluid is circulated in a different coil. A humidifier in the chamber is actuated if the relative humidity is below the selected minimum chamber relative humidity. Apparatus is provided to facilitate performing the method of the invention.

In another aspect, the invention comprises apparatus for holding eggs made up of four walls connected to form a rectangular upright tray margin. A screen is connected to the lower edges of the walls to form an egg tray bottom and a first insert is provided which comprises a plurality of elongate members fixed in parallel spaced relationship to one another. A second insert is provided in which a plurality of second-insert elongate members are fixed in parallel spaced relationship to one another. The first-insert elongate members have a different parallel spaced relationship from that of the second-insert elongate members. Each of the inserts is placeable on the screen with the elongate members parallel to the screen thereby defining a plurality of parallel channels for receiving eggs arranged end-to-end to form a single row in each channel.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 2 is a partial cross section taken along line 2—2 in FIG. 1.

FIG. 3A is a bottom plan view of an egg tray constructed in accordance with the instant invention.

FIG. 3B is a side elevation view of the egg tray.

FIG. 3C is an end view of the egg tray.

FIG. 4A is a plan view of a first insert for the egg tray of FIGS. 3A-3C.

FIG. 4B is an end view of the first insert.

FIG. 5A is a plan view of a second insert for the egg tray of FIGS. 3A-3C.

FIG. 5B is an end view of the second insert.

DETAILED DESCRIPTION OF THE PREFERRED EMBODIMENT

Figure 1:
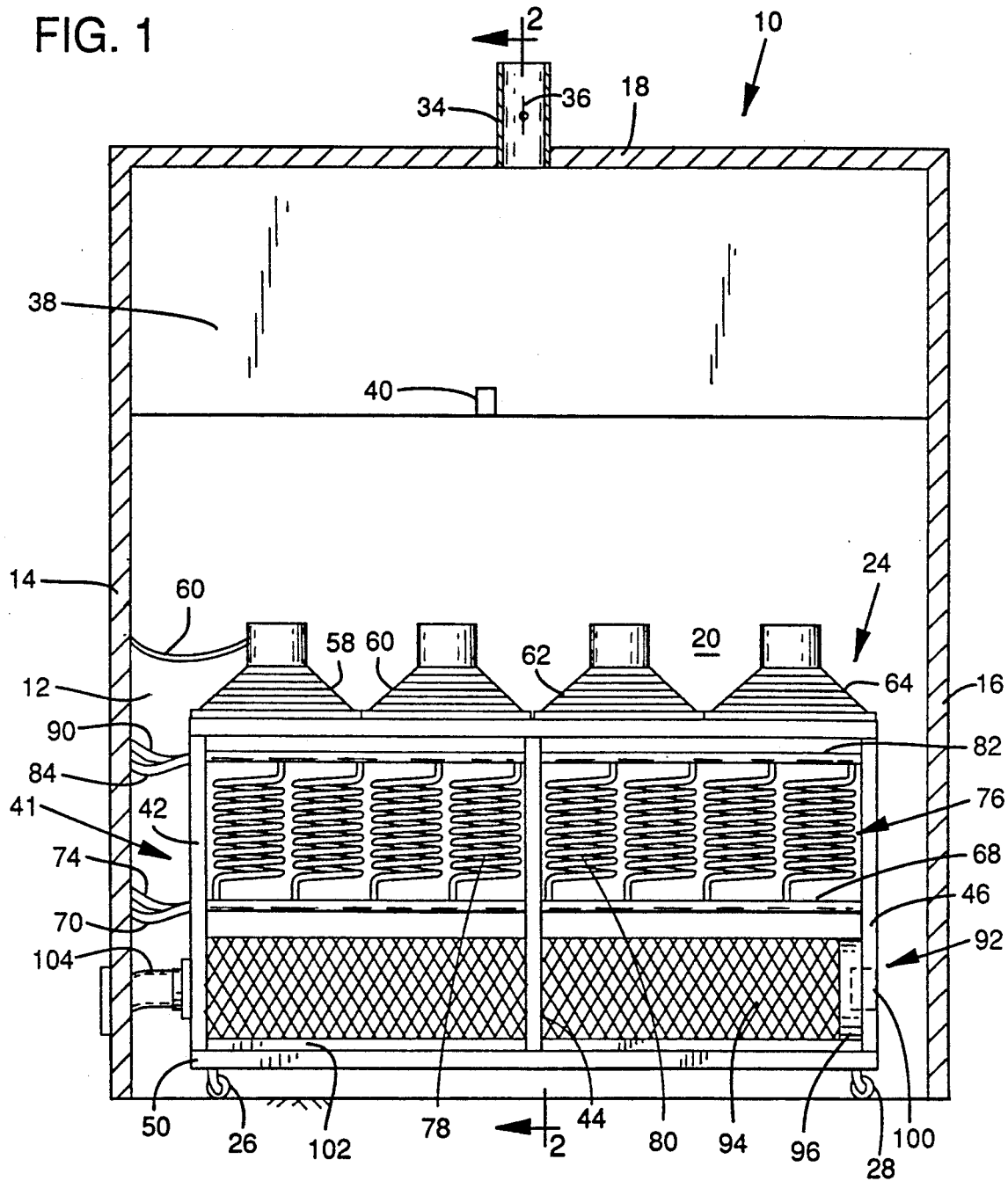
FIG. 1 is an elevation view shown partially in section.

Indicated generally at 10 is an incubator constructed in accordance with the present invention. Incubator 10 includes an incubation chamber 12 which is defined by four walls, two of which are opposing walls 14, 16 and a ceiling 18. An inner surface 20 of one of the walls, wall 22 (FIG. 2), is viewable in FIG. 1. The walls and ceiling are made of a fiber plastic resin containing foam insulation material. Access to the chamber is through a door (not shown) which is preferably like that shown in U.S. Pat. No. 3,797,172 for a rollaway door, which patent is assigned to the assignee of the present invention.

An air control unit, indicated generally at 24, is rollably mounted on wheels, three of which are wheels 26, 28, 30. Although not illustrated in detail herein, a pair of rollable racks, one of which is designated by dashed outline 32 in FIG. 2, are positioned on either side of air control unit 24 as viewed in FIG. 2. Each of the racks includes a plurality of trays, preferably like the tray and related inserts illustrated in FIGS. 3A-7 herein and which will be hereinafter more fully described. Each of the trays includes a plurality of eggs which are incubated and hatched in chamber 12 in accordance with the present invention.

Generally speaking, air control unit 24 controls the temperature, relative humidity and air circulation in incubation chamber 12 during the incubation and hatching of the eggs in the racks. Such control is responsive to a microprocessor-based system, illustrated schematically in FIG. 8, which will be described in more detail hereinafter.

Continuing with a detailed description of the structure illustrated in FIGS. 1 and 2, a vent pipe 34 is centrally located in ceiling 18 and provides communication between the interior of chamber 12 and the exterior thereof. A commercially available motor-powered damper 36 is mounted on vent pipe 34 in the usual manner. A motor (not shown) is drivable to set damper 36 between a first position, which shuts off air flow in vent pipe 34, and a second position which substantially completely opens the vent pipe. Damper 36 is illustrated in its second position.

A divider 38 extends between chamber walls 14, 16 and extends downwardly from ceiling 18 to form an air flow barrier.

A removable sensing unit 40 is mounted on divider 38 and contains commercially available air temperature, relative humidity and carbon dioxide sensors for monitoring the environment chamber 12. The sensors are incorporated into the microprocessor-based control system in FIG. 8 and are illustrated schematically therein.

Air control unit 24 includes a frame, indicated generally at 41, having a plurality of upright members 42, 44, 46, 48. Frame members 42, 44, 46 are connected at their upper and lower ends by horizontal frame members 50, 52. Vertical frame members 44, 48 are connected at their upper and lower ends by horizontal frame members 54, 56, respectively. Fans 58, 60, 62, 64 are mounted on the uppermost portion of frame 41 and are oriented to circulate air from the bottom of the incubation chamber to the top thereof as illustrated by the arrows in FIG. 2. A detachable electric cord 60 connects the fans to a source of electrical power (not shown).

A hot water manifold 68 is mounted on frame 41 and is in fluid communication with a disconnectable flexible hose 70. Hose 70 is in turn connected, via a control valve (not shown in FIGS. 1 or 2), to a water heating unit (also not shown). A cold water manifold 72 (in FIG. 2) is likewise mounted on frame 41 in parallel spaced relationship to manifold 68. Manifold 72 is connected to a disconnectable flexible hose 74 which in turn is connected, via a control valve (not shown in FIGS. 1 or 2), to a water cooling unit (also not shown).

Manifolds 68, 72 are connected to a heat exchanger indicated generally at 76. Heat exchanger 76 comprises a plurality of coils, like coils 78, 80, which form a first bank of coils that are in fluid communication with either manifold 68, or with manifold 72, at the lower ends thereof. There is a coil behind each coil visible in FIG. 1 which defines a second bank of coils with coil 86, in FIG. 2, being the only one visible. The coils in both banks are alternately connected to manifolds 68, 72 so that each hot water coil in each bank is between a pair of cold water coils and vice versa. Furthermore, the coil pairs defined by the adjacent banks of coils, like coils 78, 86 in FIG. 2, each include one hot coil and one cold one.

Each of the coils in heat exchanger 76 which is connected to hot water manifold 68 at the lower end thereof has its upper end connected to a hot water return pipe 82. Pipe 82 is mounted on frame 41 and is in fluid communication with a disconnectable flexible hose 84 which is connected to the hot water heating unit (not shown), which heats the water and recirculates it to manifold 68 via hose 70.

Each of the coils in heat exchanger 76 which is connected to cold water manifold 72 at the lower end thereof has its upper end connected to a cold water return pipe 88. A disconnectable flexible hose 90 is in fluid communication with cold water return pipe 88 and is also connected to the water cooling unit (not shown) for recirculation of cooled water to the cold water manifold via hose 74.

Indicated generally at 92 is what is referred to herein as a humidifier or humidifying means. The humidifier includes a tubular element 94 having a plurality of diamond-openings, best viewed in FIG. 1, formed therein. In the instant embodiment of the invention, tubular element 94 is made from heavy-duty screen which is formed in the shape of a cylinder. Element 94 includes a pair of opposing end pieces, one of which is end piece 96 in FIG. 1, which are fixedly connected to the tubular element and to a central shaft 98 which is journaled on frame 41 for rotation about the axis thereof. An electric motor 100 (in FIG. 1) is mounted on frame 41 at one end of the tubular element for rotating shaft 98. A water pan 102 is mounted on frame 41 beneath tubular element 94 and is filled with water. The pan includes a float valve (not visible) which is connected to a source of water (also not visible) for maintaining a preselected water level in the pan. As best viewed in FIG. 2, tubular element 94 extends into pan 102 beneath the preselected water level.

A disconnectable hose 104, such being also referred to herein as communicating means, provides communication between the exterior of chamber 12 and the interior of tubular element 94.

Attention is now directed to FIGS. 3A-7 for description of a tray and associated inserts therefor which are preferably utilized in rack 32 and may be equally well utilized in other equipment and methods in which it is necessary or desirable to contain a plurality of eggs for incubation and/or hatching. A tray 106, in FIGS. 3A-3C, includes a first pair of opposing, substantially parallel walls, one of which is wall 108 and the other of which is positioned directly therebehind. A second pair of substantially opposing parallel walls, one of which is wall 110, define the short sides of tray 106. A wire screen 112 is secured to the underside of a lip 114 which extends about the perimeter of the tray walls.

A first insert 117, in FIG. 4A, comprises a plurality of elongate members or rods, like rods 118, 120, which are maintained in parallel spaced relationship by cross members or rods 122, 124, which are fixed to opposing ends of each of the parallel rods.

A second insert 126 is similar in construction to insert 117; however, the spacing between the parallel rods in insert 126 is greater than between the rods of insert 117.

Figure 6:
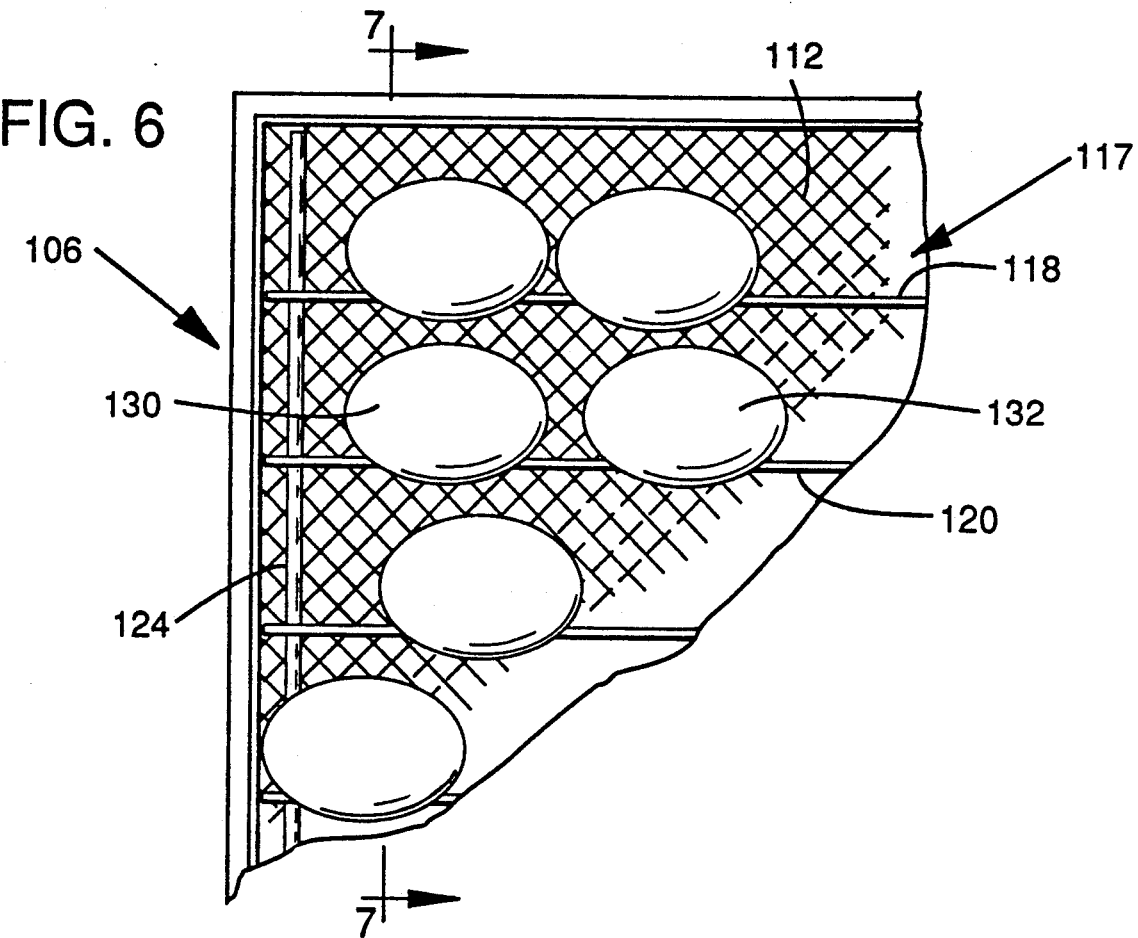
FIG. 6 is an enlarged, partial plan view of the egg tray of FIGS. 3A-3C with the insert of FIGS. 4A and 4B cooperating with eggs received in the tray.
Figure 7:
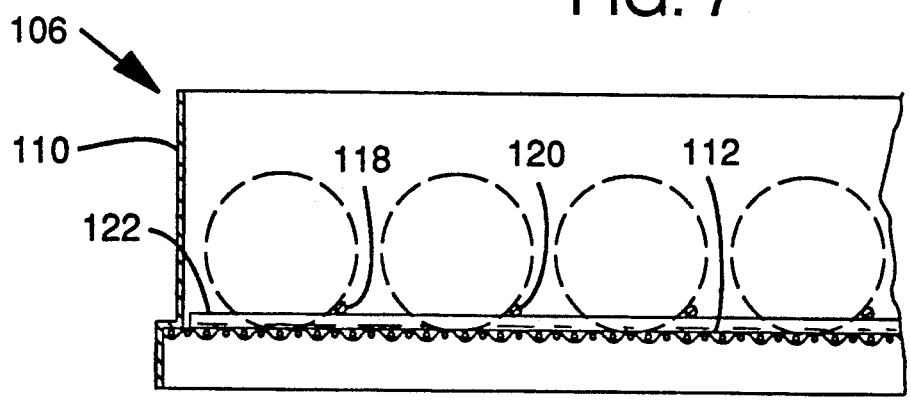
FIG. 7 is a sectional view taken along lines 7—7 in FIG. 6.

In FIGS. 6 and 7, insert 117 is placed flat on screen 112 with rods 122, 124 flush against the screen. The parallel rods, like rods 118, 120, are thus spaced above the screen by a distance equal to the thickness of rods 122, 124. A plurality of channels for receiving eggs, like eggs 130, 132, are defined between the parallel rods. One such channel is that formed between rods 118, 120 which receives a plurality of eggs, two of which are eggs 130, 132. Eggs in each channel are placed in end-to-end relationship to one another along the length of the channel.

Rack 32 in FIG. 2 contains a plurality of such trays with each such tray containing an insert and a plurality of eggs as illustrated in FIGS. 6 and 7.

Figure 8:
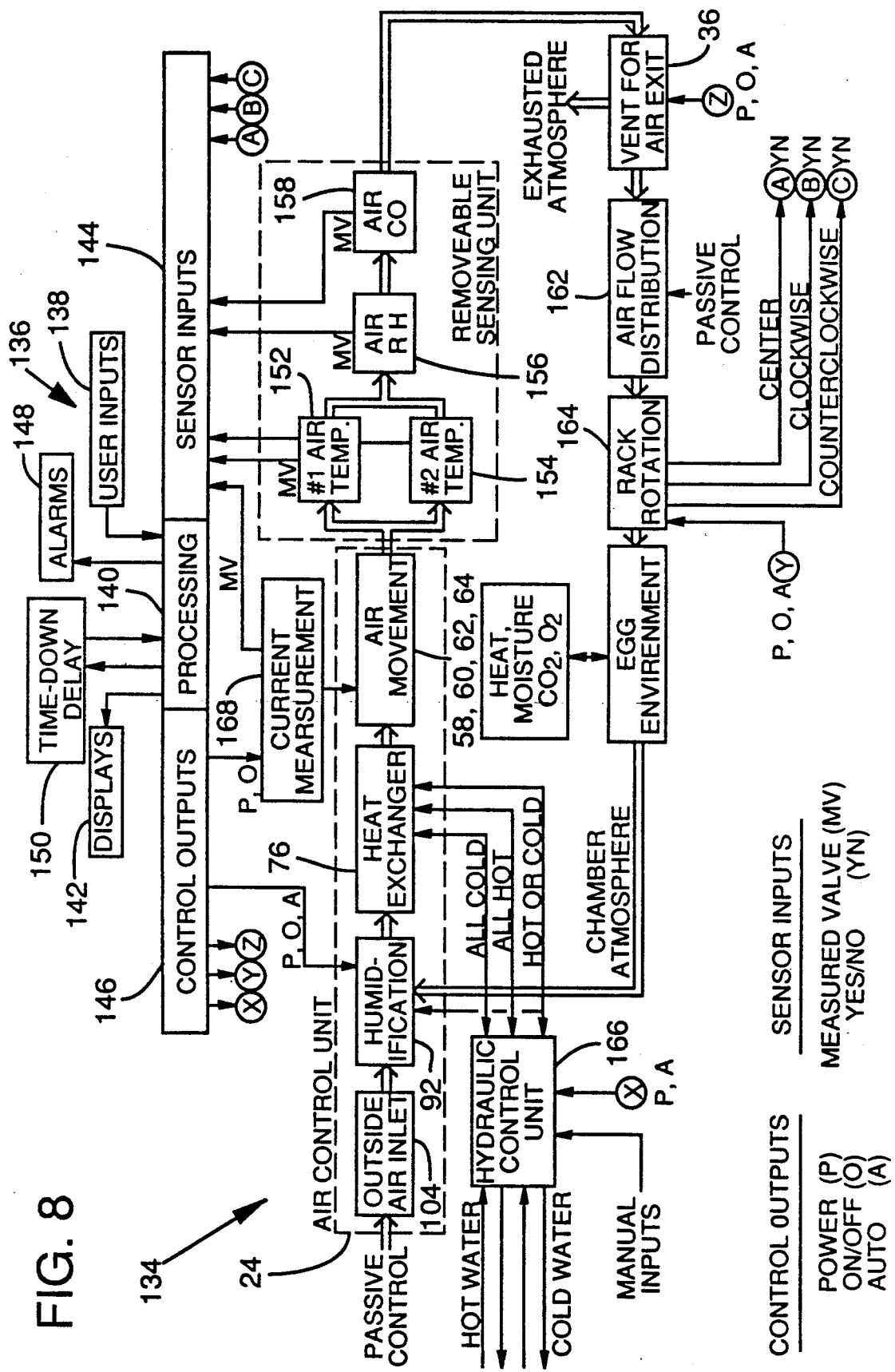
FIG. 8 is a combined process flow and control system diagram in accordance with the present invention.

Turning now to FIG. 8, indicated generally at 134 is a combined process flow and control system diagram for incubator 10 and its related controls.

Indicated generally at 136 is a computer which senses a number of incubator parameters and which also generates a number of control outputs for adjusting incubator conditions. Computer 136 includes a keyboard and control panel 138, both such being designated "user inputs" in the diagram. The computer further includes a processor 140 and related memory (not shown) in which a computer program is stored. The computer includes the usual displays 142, such as a printer and cathode ray tube, for displaying information relating to the incubator control system. The computer includes an input port for receiving a plurality of sensor inputs 144 and an output port for generating a plurality of control outputs 146. Processor 140 is also connected to visible and audible alarms 148 which are generated when certain of the system parameters exceed user-defined limits which are stored in the computer memory. The alarms are also generated in the event power to the components illustrated in FIG. 8 is lost.

The processor also includes an output connected to a commercially available time-down relay 150. Relay 150 functions, in a manner which will be hereinafter explained, to turn off the computer in the event of a program failure or computer "crash."

Structure which has been previously identified in FIGS. 1-7 retains the same numeral in the diagrammatic illustration of FIG. 8. As can be seen in FIG. 8, outside air is drawn through hose 104, humidifier 92 and heat exchanger 76 under the action of fans 58, 60, 62, 64. Sensing unit 40, mounted on divider 38 in FIGS. 1 and 2, includes therein two commercially available temperature sensors 152, 154, a commercially available relative humidity sensor 156 and a commercially available carbon dioxide sensor 158. Each of the sensors in sensing unit 40 generates an electrical signal indicative of the parameter sensed and supplies the same via conductors, as shown in FIG. 8, to sensor inputs 144 of the computer. The designation "MV" in FIG. 8 stands for "measured value" and represents an analog signal proportional to the sensed parameter.

A portion of the air circulation is vented via damper 36 which is operated responsive to a control line Z from control outputs 146. The notation "P, O, A" adjacent damper 36 indicates that the control input to damper 36 includes an electrical power line for adjusting damper position and that it may be automatically operated by computer 136 or may be turned on/off by an operator. These meanings apply where the "P, O, A" designation occurs throughout FIG. 8.

A block 162 denominated "air flow distribution" refers to distribution of air in the incubator chamber responsive to the geometry of the chamber and the physical objects therein.

A rack rotation system 164 which rotates rack 32 in a known manner responsive to electrical signals appearing on a line Y from control outputs 146. Lines A, B, C are connected to sensor inputs 144 and indicate whether rack 32 is centered, rotated clockwise or rotated counterclockwise. The "YN" adjacent lines A, B, C indicates that the line is for conducting a digital as opposed to analog value. Air, after circulating among the eggs in rack 32, returns to air control unit 24, as illustrated by the air flow arrows in FIG. 2, for rehumidification, cooling or heating, and recirculation.

A hydraulic control unit 166 supplies hot and cold water to heat exchanger 76 via hoses 70, 74 in FIG. 1. Valves (not shown) in the hydraulic control unit are electrically operable, via signals on line X from control outputs 146, responsive to automatic computer control. Hydraulic control unit 166 is further manually operable by manual manipulation of the valves for rapidly changing the temperature of the incubator chamber.

Under automatic operation, when heating, pulses of hot water are periodically applied via hot water hose 70 to the hot water exchanger coils and no water flows through the cold water coils. Similarly, when cooling, pulses of cold water are applied via hose 74 to the cold water coils and no water flows through the hot water coils. Such pulses are created responsive to signals generated on line X by computer 136 and produce duty cycle control of the temperature in the incubation chamber.

As indicated on the lines connecting hydraulic control unit 166 with heat exchanger 76 in FIG. 8, the hydraulic control unit can be manually manipulated to run hot water through all of the coils in heat exchanger 76 or cold water through all of the coils in the heat exchanger. Such may be necessary or desirable in order to quickly change the temperature of the incubation chamber. When power is lost to hydraulic control unit 166, the hot water valve assumes a normally shut condition while the cold water valve assumes a normally open condition, thus preventing any circulation of hot water in the heat exchanger coils and permitting a flow of cold water through the cold water coils.

Finishing now the description of structure illustrated in FIG. 8, a current measuring device 168 senses flow of current in the fans and provides a signal proportional to the current flowing through the fans to sensor inputs 144. Fan power is supplied via a control output line which is not under automatic control of the computer but may be turned on and off by a switch at the control panel in user inputs 138. It is typically desirable to have fan air circulation at all times regardless of other incubator chamber conditions.

In operation, a number of eggs are loaded into trays (preferably like the tray in FIG. 3) which preferably have either insert 117 or insert 126 received therein as shown in FIGS. 6 and 7. It is to be appreciated that in the instant embodiment of the invention, insert 117 is usable in connection with chicken eggs while insert 126 is usable in connection with turkey eggs which are readily accommodated by the wider spacing of rods in insert 126. It is to be appreciated that other inserts can be created to accommodate other relevant species. In any event, the appropriate insert is selected, placed on the tray bottom, and the tray is filled with eggs as shown in FIGS. 6 and 7.

A number of such trays are so loaded and loaded on rack 32 which is then placed in the incubation chamber as shown in FIG. 2. A substantially identical rack loaded in substantially the same way is also placed in the incubation chamber on the opposite side of air control unit 24 from rack 32 (not shown in FIG. 2). Thereafter, the doors (not shown) to the incubation chamber are closed and the system is activated via computer 136.

Prior to commencing the incubation process, the operator preselects a desired temperature, minimum relative humidity and maximum carbon dioxide level which values are input via computer 136 and stored in the memory. Also stored in the memory is a computer program which controls the incubation process as set forth hereinafter. The program comprises a self-adjusting, proportional integral derivative control algorithm, such being known in the art as a PID. The PID regulates the temperature, minimum relative humidity and maximum carbon dioxide level to within a preselected range. A person having ordinary skill in the art can write such a program using a PID.

The operator can program a time-varying profile for temperature, relative humidity and carbon dioxide. In other words, different parameters may be stored in computer memory for different time periods during the incubation and hatching process. The computer automatically (responsive to the PID program) changes the value, e.g., temperature, in the incubation chamber in accordance with the new value stored by the operator and at the time selected (and stored) by the operator prior to initiating the process.

The computer turns on fans 58, 60, 62, 64 to circulate air as illustrated by the arrows in FIG. 2. Humidifier 92 is also energized to rotate element 94 under power of motor 100. Air is drawn through hose 104 and into element 94. As element 94 rotates, water is picked up by at least some of the diamond-shaped openings in the form of a film disposed between the edges of each opening much like a soap film supported by the circular perimeter of a loop for blowing bubbles. With a number of such water films being held by the various openings, a very high water surface area is exposed to the interior of the chamber thus causing a high rate of water evaporation.

The humidified air is drawn upwardly through coils in the heat exchanger at which point heat is transferred from the air to the cold water coils or, if water is circulating in the hot water coils, heat is transferred from the hot water coils to the air. Any condensation which occurs during this process, falls back down into the water pan of the humidifier or collects on the coils which prevents water droplets from being distributed elsewhere in the incubation chamber. Thus, evaporative humidification as described humidifies the air without creating water droplets throughout the incubation chamber in which harmful microorganisms can grow.

As air circulates, temperature sensor 152 senses the temperature thereof and provides a signal proportional to the air temperature to sensor inputs 144. Sensor 154 is a back-up to sensor 152 in the event of failure of sensor 152.

If the air temperature is above the user-selected range stored in the computer memory, a control output is generated on line X (responsive to the PID program) which causes hydraulic control unit 166 to provide periodic flows of cold water into the cold water coils in the heat exchanger. Such action lowers the air temperature in the incubation chamber and when the preselected temperature is reached, circulation of water through the coils stops.

If the temperature falls below the preselected range, pulses of hot water are provided to the hot water coils in a similar fashion until sensor 152 indicates that the selected air temperature is achieved.

The water entering the lower ends of the coils in heat exchanger 76 tends to flush any air bubbles upwardly in the coils. Such action diminishes the likelihood that air can become entrapped in a coil.

A similar feedback control occurs with respect to relative humidity sensor 156 which causes control outputs to automatically start and stop the motor in humidifier 92. If the relative humidity is below the preselected level, the motor is turned on, and if above that level, the motor is turned off all under control of computer 136 (which operates pursuant the PID program) via signals applied to line X.

If the carbon dioxide level rises above the user-selected level stored in the computer memory, as indicated by sensor 158, a control output is generated on line Z which operates damper 36 causing the same to open thus exhausting air from the incubator. Fresh air is drawn in through hose 104 and when the carbon dioxide level falls below the preselected maximum level stored in the computer memory, as detected by sensor 158, the damper again shuts responsive to a computer-generated control output.

Such automatic control of carbon dioxide levels responsive to sensor 158 is optional. When the control is not provided automatically, it may be desirable to connect damper 36 to open each time hydraulic control unit 166 causes cold water to flow into heat exchanger 76. Later in the incubation cycle, the eggs produce heat rather than absorb it. Carbon dioxide production by the eggs also increases during the cycle. It has been found that ventilation of the incubation chamber via damper 36 each time the cold water runs correlates nicely to the need for ventilating the chamber to reduce carbon dioxide therein.

Rack rotation, responsive to system 164, occurs in accordance with a preselected schedule entered by an operator at the computer. Like most computer-controlled processes, the one implemented in the instant embodiment of the invention uses a program which moves in a loop to check the various sensor inputs and responds (in accordance with the PID program) by generating, or continuing to generate, an appropriate output after each sensor input is evaluated. Such a program could be easily written by a computer programmer having ordinary skill in the art. For example, the program first checks for fan current in device 168, and assuming fan current is present, moves to check temperatures indicated by sensor 152. If a temperature change is indicated, as a result of comparison of the sensed temperature with the stored desired temperature, appropriate outputs are generated to hydraulic control unit 166 to effect the change. Similarly, the program sequentially checks relative humidity and carbon dioxide and after checking each parameter generates appropriate outputs for controlling the checked parameter.

One of the program actions taken in this sequential series of checks and responses is to start time-down relay 150 each time the computer completes a check of all sensed parameters. Relay 150 begins timing down for a preselected period and should it complete timing, the relay disconnects the computer from the remainder of the system thereby placing the system control elements, such as the heat exchanger, fans and damper, in conditions which preserve egg life. Time-down relay 150 has sufficient time to complete a count before it is reset in the next sequential checking of parameters only if the program fails to complete a loop in the preselected time or if the computer crashes.

If the time-down relay so disconnects the computer, hydraulic control unit 166 reverts to its power-off condition, i.e., cold water continuously circulates in the cold water coils and all hot water circulation is prevented. Also, electrical power continues to be supplied to the fans to maintain air circulation, the damper goes to its power-off position, i.e., full open, to maintain maximum air circulation through the incubator and the humidifier is turned off. This is a "safe" state which creates a chamber environment for preserving egg life. It is to this state, with the exception of fan-powered air circulation, that the system reverts to when all power is lost.

Simultaneously with the foregoing action, visible and audible alarms 148 are sounded to alert the operator of a system malfunction. In the event that immediate action must be taken to swiftly change temperature in the incubator, the manual inputs, i.e., manual valve manipulation, to hydraulic control unit 166, can be used to direct cold water flow through all of the coils in heat exchanger 76 or conversely hot water may be circulated through all of the coils in order to rapidly heat the chamber.

Computer 136 may be programmed to create appropriate conditions in incubation chamber 12 for incubation and hatching of chicks thus eliminating the need for transferring the incubated eggs from one tray to another for hatching. After the chicks are hatched, air control unit 24 is rolled from the incubation chamber, after disconnecting the various hoses and power cords, to permit aggressive cleaning and disinfecting of the chamber and air control unit. The simplicity and durability of the structure of the coils and of the other structure in air control unit 24 permit rapid and effective cleaning and disinfecting of the air control unit and easy cleaning of the incubation chamber.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A method for incubating and hatching eggs comprising the steps of:
   providing a first upright helical coil for conducting a relatively hot fluid and a second upright helical coil for conducting a relatively cold fluid;
   placing the coils in an insulated chamber;
   providing a humidifier in the chamber;
   placing a plurality of eggs in the chamber;
   selecting a chamber temperature and a minimum chamber relative humidity;
   periodically monitoring the chamber temperature;
   producing a relatively hot fluid flow in the first coil if the temperature is below the selected chamber temperature;
   producing a relatively cold fluid flow in the second coil if the temperature is above the selected chamber temperature;
   periodically monitoring the chamber relative humidity; and
   actuating the humidifier if the relative humidity is below the selected minimum chamber relative humidity.

2. A method according to claim 1 wherein the step of producing a relatively hot fluid flow in the first coil comprises the step of alternately starting and stopping such flow.

3. A method according to claim 1 wherein the step of producing a relatively cold fluid flow in the second coil comprises the step of alternately starting and stopping such flow.

4. A method according to claim 1 wherein the step of periodically monitoring the chamber relative humidity comprises the step of sensing the weight of the eggs.

5. A method according to claim 1 wherein said method further comprises the steps of:
   sensing electrical power which may be required to perform certain of the foregoing steps;
   sensing the rate of periodic monitoring of chamber environmental factors;
   creating a chamber environment for preserving egg life responsive to a predetermined change in the rate of such periodic monitoring or in the absence of electrical power; and
   thereafter generating an alarm.

6. The method of claim 5 wherein the step of creating a chamber environment for preserving egg life comprises the steps of:
   preventing the flow of hot fluid;
   permitting the flow of cold fluid; and
   deactivating the humidifier.

7. The method of claim 6 wherein said method further comprises the steps of:
   circulating air within the chamber; and
   maintaining the air circulation regardless of changes in the rate of such periodic monitoring.

8. A method for incubating and hatching eggs comprising the steps of:
   providing a first coil for conducting a relatively hot fluid and a second coil for conducting a relatively cold fluid;

placing the coils in an insulated chamber;
providing a humidifier in the chamber;
placing a plurality of eggs in the chamber;
selecting a chamber temperature and a minimum chamber relative humidity;
periodically monitoring the chamber temperature;
producing a relatively hot fluid flow in the first coil if the temperature is below the selected chamber temperature;
producing a relatively cold fluid flow in the second coil if the temperature is above the selected chamber temperature;
periodically monitoring the chamber relative humidity;
actuating the humidifier if the relative humidity is below the selected minimum chamber relative humidity;
selecting a maximum chamber carbon dioxide level;
periodically monitoring the chamber carbon dioxide level; and
increasing chamber ventilation if the chamber carbon dioxide level is above the selected maximum chamber carbon dioxide level.

9. A method for incubating and hatching eggs comprising the steps of:
providing a first coil for conducting a relatively hot fluid and a second coil for conducting a relatively cold fluid;
placing the coils in an insulated chamber;
providing a humidifier in the chamber;
placing a plurality of eggs in the chamber;
selecting a chamber temperature and a minimum chamber relative humidity;
periodically monitoring the chamber temperature;
producing a relatively hot fluid flow in the first coil if the temperature is below the selected chamber temperature;
producing a relatively cold fluid flow in the second coil if the temperature is above the selected chamber temperature;
periodically monitoring the chamber relative humidity;
actuating the humidifier if the relative humidity is below the selected minimum chamber relative humidity;
selecting a maximum chamber carbon dioxide level;
periodically monitoring the chamber carbon dioxide level;
increasing chamber ventilation if the chamber carbon dioxide level is above the selected maximum chamber carbon dioxide level;
maximizing chamber ventilation responsive to a predetermined change in the rate of such periodic monitoring or in the absence of electrical power;
sensing electrical power which may be required to perform certain of the foregoing steps;
sensing the rate of periodic monitoring of chamber environmental factors;
creating a chamber environment for preserving egg life responsive to a predetermined change in the rate of such periodic monitoring or in the absence of electrical power, said step of creating a chamber environment for preserving egg life comprising:
preventing the flow of hot fluid;
permitting the flow of cold fluid; and
deactivating the humidifier; and
thereafter generating an alarm.

10. Apparatus for controlling temperature and humidity, said apparatus comprising:
a hot fluid manifold;
a cold fluid manifold;
a plurality of upright helical coils in fluid communication with said hot fluid manifold;
a plurality of upright helical coils in fluid communication with said cold fluid manifold; and
a fan disposed above said coils for drawing air through said coils.

11. An apparatus according to claim 10 wherein said apparatus further includes humidifying means disposed beneath said coils and wherein said fan is oriented for drawing air through said humidifying means and said coils.

12. An apparatus according to claim 11 wherein said manifolds, said coils, said humidifying means and said fan are mounted on a frame and wherein said apparatus further includes means for rolling the frame from place to place.

13. An apparatus according to claim 12 wherein said apparatus further includes a plurality of fans disposed above said coils for drawing air through said humidifying means and said coils.

14. An apparatus according to claim 11 wherein said manifolds comprise a pair of substantially horizontal pipes and wherein the lower end of each coil is connected to one of said pipes.

15. An apparatus according to claim 14 wherein said apparatus further includes a cold fluid return pipe and a hot fluid return pipe and wherein the upper end of each coil is connected to one of said return pipes.

16. An apparatus according to claim 11 wherein said humidifying means comprises:
a tubular element having a plurality of openings formed therein;
a pan for holding liquid disposed beneath said tubular element and vertically spaced therefrom so that a lower portion of said element is submerged in liquid when said pan contains such liquid; and
means for rotating said tubular element.

17. Apparatus for controlling temperature and humidity, said apparatus comprising:
a first upright helical coil for conducting a relatively hot fluid;
a second upright helical coil for conducting a relatively cold fluid;
a tubular element having a plurality of openings formed therein disposed beneath said coils, said tubular element being journaled for rotation about its longitudinal axis in a substantially horizontal attitude;
a pan for containing liquid disposed beneath said tubular element and spaced therefrom so that a lower portion of said tubular element is submerged in liquid when said pan contains such liquid;
means for rotating said tubular element; and
a fan disposed above said coils for drawing air into one end of said tubular element, out of said openings and through said coils.

18. An apparatus according to claim 17 wherein the wall of said tubular element is formed from screen.

19. An apparatus according to claim 18 wherein said screen includes a plurality of diamond-shaped openings.

20. An apparatus according to claim 17 wherein said apparatus further includes means for communicating a gaseous medium to one end of said tubular element.

21. Apparatus for controlling temperature and humidity, said apparatus comprising:
- a hot fluid manifold;
- a cold fluid manifold;
- a plurality of upright helical coils in fluid communication with said hot fluid manifold;
- a plurality of upright helical coils in fluid communication with said cold fluid manifold;
- a tubular element having a plurality of openings formed therein disposed beneath said coils, said tubular element being journaled for rotation about its longitudinal axis in a substantially horizontal attitude;
- a pan for containing liquid disposed beneath said tubular element and spaced therefrom so that a lower portion of said tubular element is submerged in liquid when said pan contains such liquid;
- means for rotating said tubular element; and
- a fan disposed above said coils for drawing air through said tubular element and said coils;

* * * * *